(12) United States Patent
Evans

(10) Patent No.: US 9,104,661 B1
(45) Date of Patent: Aug. 11, 2015

(54) TRANSLATION OF APPLICATIONS

(75) Inventor: Ethan Z. Evans, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

(21) Appl. No.: 13/172,513

(22) Filed: Jun. 29, 2011

(51) Int. Cl.
*G06F 17/28* (2006.01)

(52) U.S. Cl.
CPC ..................... *G06F 17/28* (2013.01)

(58) Field of Classification Search
USPC .............. 703/3; 704/272, 3, 270; 348/468
See application file for complete search history.

(56) References Cited

U.S. PATENT DOCUMENTS

| 8,144,990 | B2 * | 3/2012 | Englund et al. ............... 382/181 |
| 2006/0064716 | A1 * | 3/2006 | Sull et al. ...................... 725/37 |
| 2006/0136226 | A1 * | 6/2006 | Emam ........................... 704/277 |
| 2007/0047726 | A1 * | 3/2007 | Jabbour et al. ........... 379/373.02 |
| 2008/0033728 | A1 * | 2/2008 | Chino ............................ 704/277 |
| 2008/0243473 | A1 * | 10/2008 | Boyd et al. ......................... 704/2 |
| 2009/0013086 | A1 * | 1/2009 | Greenbaum ................... 709/231 |
| 2009/0204386 | A1 * | 8/2009 | Seligman et al. .................. 704/2 |
| 2010/0203129 | A1 * | 8/2010 | Andersen et al. .............. 424/474 |
| 2010/0265397 | A1 * | 10/2010 | Dasher et al. .................. 348/468 |
| 2011/0046939 | A1 * | 2/2011 | Balasaygun ........................ 704/2 |
| 2011/0191341 | A1 * | 8/2011 | Meyer et al. ................... 707/736 |
| 2011/0321040 | A1 * | 12/2011 | Sobel et al. ......................... 718/1 |
| 2012/0078609 | A1 * | 3/2012 | Chaturvedi et al. ............... 704/3 |
| 2012/0092329 | A1 * | 4/2012 | Koo et al. ....................... 345/419 |

OTHER PUBLICATIONS

U.S. Patent Application entitled "Remotely Emulating Computing Devices" filed on May 24, 2011 and assigned U.S. Appl. No. 13/114,534.

* cited by examiner

*Primary Examiner* — Huyen Vo

(74) *Attorney, Agent, or Firm* — Thomas Horstemeyer, LLP

(57) ABSTRACT

Disclosed are various embodiments that facilitate translation of applications. An image is obtained, and text shown within the image is recognized. Translated text is generated by translating the text from one language to another. The translated text is incorporated into the image. The image is then sent to another computing device.

25 Claims, 6 Drawing Sheets

TRANSLATION OF APPLICATIONS

BACKGROUND

Software applications are often written with one language for users in mind. Menus, dialogs, labels, and/or other text shown by the application may be fixed in that language. By contrast, other applications are internationalized. Internationalization typically involves designing the application in a special way so that it may be adapted to different languages and regional variations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to translation of applications that may be executed remotely. Internationalization of applications is costly, and many applications simply are not internationalized. Moreover, internationalization typically localizes or translates text in menus, buttons, labels, and/or other well-defined user interface components. Images, audio clips, and videos are either not translated or produced manually and/or separately for each language translation. By contrast, in various embodiments of the present disclosure, video and/or audio generated by an application are captured and automatically translated in real-time. To this end, language recognition and translation techniques may be employed. The translated text and/or audio may be presented in place of, or in conjunction with, the source text and/or audio. Under approaches described herein, software developers do not have to make changes to their applications to facilitate internationalization. In the following discussion, a general description of the system and its components is provided, followed by a discussion of the operation of the same.

Figure 1:
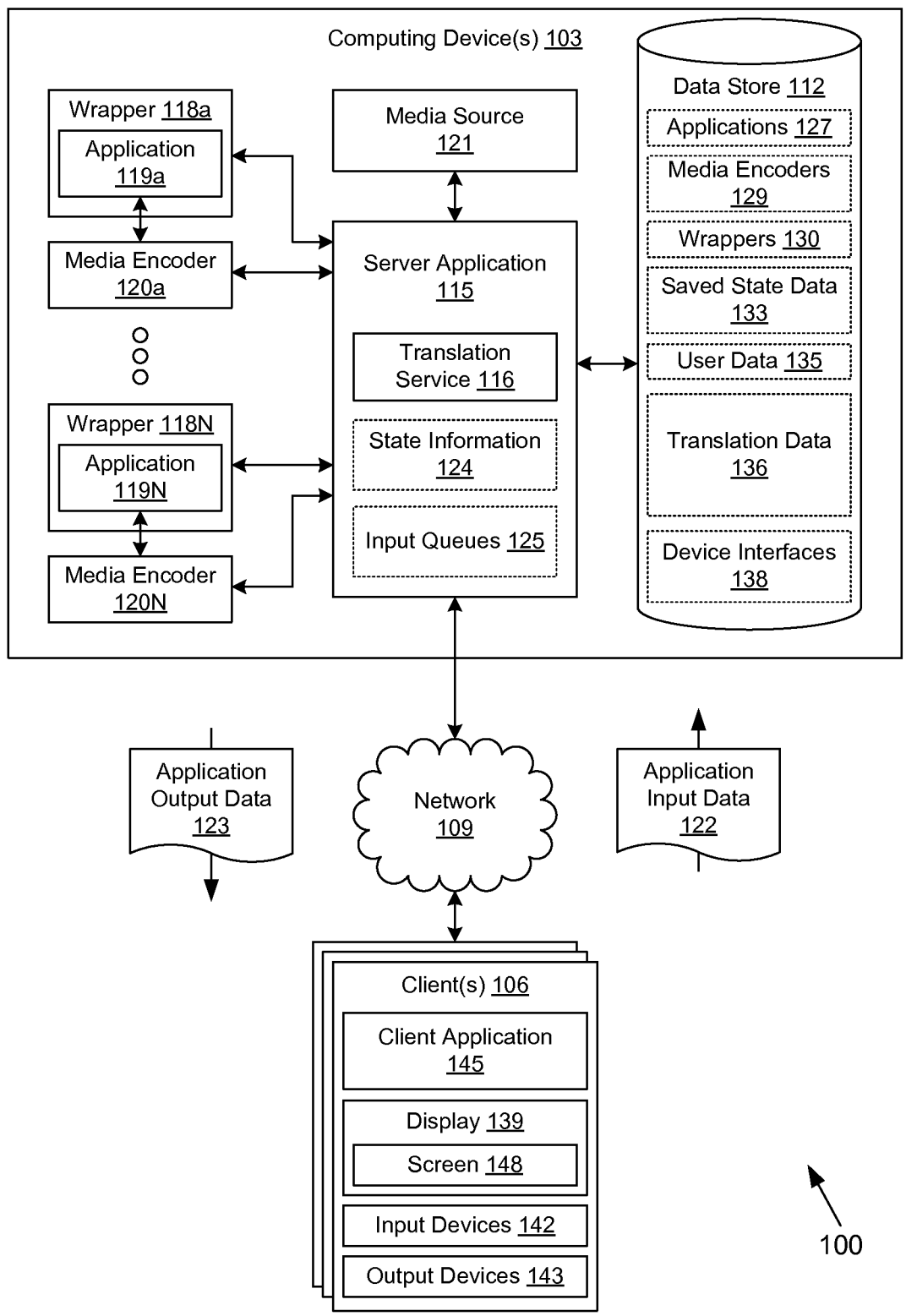
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks. Although a client-server architecture is described for the networked environment 100, it may be the case that the computing device 103 and the client 106 correspond to peers in a peer-to-peer architecture.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, a translation service 116, a plurality of wrappers 118a . . . 118N, a plurality of applications 119a . . . 119N, a plurality of media encoders 120a . . . 120N, one or more media sources 121, and other applications, services, processes, systems, engines, or functionality not discussed in detail herein. The server application 115 may correspond to a game server application or another type of application session server. The server application 115 is executed to launch applications 119, which are executed within the wrappers 118. The server application 115 is also executed to obtain application input data 122 from the clients 106 and provide the application input data 122 to the respective wrapper 118.

The server application 115 is also executed to send application output data 123 that is captured from the application 119 to the clients 106. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain state information 124 and input queues 125 associated with the executing applications 119.

The translation service 116 is executed in conjunction with the server application 115 to translate video and/or audio signals generated by the applications 119 and/or the media sources 121. In some embodiments, the translation service 116 may be configured to translate various forms of media streams that have been encoded by the media encoders 120.

To this end, the translation service 116 may be configured to recognize text in a video signal, translate the text into a different language, and then incorporate the translated text in the video signal. The translation service 116 may also be configured to recognize speech in an audio signal, translate the speech into a different language, and then incorporate the translated speech into the audio signal. Where the video and/or audio signals are generated by the applications 119, the applications 119 are thereby translated and localized without the developers having to internationalize the applications 119.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be a game originally designed for execution in a general-purpose computing device or in a specialized video game device such as, for example, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, etc. In this way, the wrapper 118 is able to provide input commands to the application 119 as if the wrapper 118 emulates a keyboard, a mouse, an accelerometer, a touch screen, or another type of input device.

Further, the wrapper 118 is able to obtain a video signal generated by the application 119 as if the wrapper 118 emulates a display device, an audio device, or another type of output device. The wrapper 118 is able to encode the video signal and/or audio signal by way of a media encoder 120 into a media stream. To this end, the wrapper 118 may include various types of media encoders 120, such as, for example, Moving Pictures Experts Group (MPEG) encoders, H.264 encoders, Flash® media encoders 120, etc. Such media encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized video game device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections.

The state information 124 that is maintained by the server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119. The input commands may be reordered to a correct sequence and delays may be inserted between commands to ensure that they are interpreted correctly when presented to the corresponding application 119.

In one embodiment, one or more media sources 121 may be provided to generate video and/or audio signals independently from an application 119. As a non-limiting example, the media source 121 may correspond to a video file, digital video disc (DVD), Blu-Ray® disc, three-dimensional (3D) video stream, holographic video stream, cable television stream, broadcast television stream, radio stream, images, and/or other media streams. It is noted that an image processed by the translation service 116 may comprise one or more component images. Such component images may form a larger scene or may be another visual representation such as, for example, a 3D composite, holographic projection, etc. Accordingly, the server application 115 in conjunction with the translation service 116 may be employed to translate movies, television, radio programs, and other forms of streaming media in real-time. In other embodiments, the media source 121 may correspond to a presentation, such as a Microsoft® PowerPoint® presentation or other presentation, a portable document format (PDF) file, and/or other media sources 121.

The data stored in the data store 112 includes, for example, applications 127, media encoders 129, wrappers 130, saved state data 133, user data 135, translation data 136, device interfaces 138, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The media encoders 129 correspond to the various types of media encoders 120 that may be employed in the computing device 103. Some media encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple application sessions.

The saved state data 133 corresponds to application states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 135 includes various data related to the users of the applications 119, such as, for example, security credentials, application preferences, language translation preferences, billing information, a listing of other users that are permitted to join application sessions started by the user, and so on.

The translation data 136 corresponds to various data that may be employed to facilitate translation of media streams by the translation service 116. To this end, the translation data 136 may incorporate various mappings to and from various languages. It is noted that the languages may be localized languages for a given locale, e.g., United States English, United Kingdom English, and so on. The mappings between languages may incorporate simple dictionary-style word-based translations as well as more complex semantic-analysis rules to determine the correct translations in context. The translation data 136 may include data to facilitate text recognition, speech recognition, text generation, and/or speech generation. For example, the translation data 136 may include fonts for text generation and voice samples for speech generation.

The translation data 136 may incorporate rules to facilitate translation of text to and from left-to-right styles, right-to-left styles, horizontal styles, vertical styles, and so on. Such style translations may be applied within a page or within multiple pages as applicable, e.g., for an electronic book reader to convert a book that is right-to-left formatted into a book that is left-to-right formatted. Additionally, the translation data 136 may facilitate recognition of systems of units and conversion between a system of units associated with a first language and a system of units associated with a second language. Such systems of units may correspond to currencies, the metric system, the United States customary system, and so on. For currency conversion and/or other dynamic conversions, external data may be employed in the translation data 136.

The device interfaces 138 correspond to images, animations, code, hypertext markup language (HTML), extensible markup language (XML), cascading style sheets (CSS), and/or other data that may be used to generate a graphical representation of a virtualized computing device. It is noted that an application 119 that is executable on a particular computing device platform may be associated with a multitude of device interfaces 138. As a non-limiting example, the Android® platform for smartphones may be supported by a multitude of different models of smartphones. Some of the models may have mini-keyboards with a touchscreen, while others may have merely a touchscreen with no physical mini-keyboard. The models may have different controls and casings. Therefore, different device interfaces 138 may be provided for different models of Android® smartphones.

In some embodiments, multiple different device interfaces 138 may be used in conjunction with one wrapper 130. Where the emulated computing device does not include an integrated display, the device interface 138 may include a representation of an external display device showing video generated by the emulated computing device. Similarly, other non-integrated external devices that may connect to the emulated computing device (e.g., keyboards, mice, etc.) may be represented by the device interface 138.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, touch screens, push buttons, optical sensors, microphones, webcams, and/or any other devices that can provide user input. Additionally, various input devices 142 may incorporate haptic technologies in order to provide feedback to the user. The output devices 143 may correspond to the output sections of haptic input devices 142, vibration devices, buzzing devices, audio devices, indicator lights, seven-segment display devices, and so on.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as application input data 122.

The client application 145 is also configured to obtain application output data 123 over the network 109 from the computing device 103 and render a screen 148 on the display 139. To this end, the client application 145 may include one or more video and audio players to play out a media stream generated by an application 119. In one embodiment, the client application 145 comprises a plug-in within a browser application. The client 106 may be configured to execute applications beyond the client application 145 such as, for example, browser applications, email applications, instant message applications, and/or other applications.

In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119. In some embodiments, the client application 145 may simply correspond to a media player to play out a media stream served up and translated by the server application 115 from the media source 121.

Next, a general description of the operation of the various components of the networked environment 100 is provided. To begin, a user at a client 106 sends a request to launch an application 119 to the server application 115. The server application 115 obtains the corresponding application 127, media encoder 129, and wrapper 130 from the data store 112. The server application 115 then launches the application 119 in the corresponding wrapper 118. The server application 115 tracks the status of the application 119 within the state information 124. Various techniques related to applications 119 that are executed remotely are described in U.S. patent application entitled "Remotely Emulating Computing Devices" filed on May 24, 2011 and assigned application Ser. No. 13/114,534, which is incorporated herein by reference in its entirety.

The wrapper 118 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper 118 may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the application 119 by using the input devices 142 of the client 106. As a non-limiting example, the user may depress a left mouse button. Accordingly, the client application 145 functions to encode the input command into a format that may be transmitted over the network 109 within the application input data 122. The server application 115 receives the input command, adds it to the input queue 125 for the application 119, and ultimately passes it to the wrapper 118. In some cases, the input command or a group of input commands may be translated from a form associated with one type of input device 142 into a translated form associated with a virtualized input device provided by the wrapper 118.

In some embodiments, other different input commands may be presented to the application 119 from those that were generated by a client 106. As a non-limiting example, if a user sends a mouse down command and the client application 145 loses focus, the wrapper 118 may be configured to send a mouse down command followed by a mouse up command. In various embodiments, the input commands may be relayed to the wrapper 118 as soon as possible, or the input commands may be queued by the wrapper 118 in the input queue 125 and relayed to the application 119 sequentially from the queue according to another approach.

Meanwhile, the graphical output of the application 119 is captured by the wrapper 118 and encoded into a media stream. Additionally, the audio output of the application 119 may be captured and multiplexed into the media stream. The graphical output and/or audio output of the application 119 may be captured by hardware devices of the computing device 103 in some embodiments. The media stream is transmitted by the server application 115 to the client 106 over the network 109 as the application output data 123. The client application 145 obtains the application output data 123 and renders a screen 148 on the display 139. In some embodiments, a graphical representation of an emulated computing device is rendered in the client 106 according to a device interface 138, where at least a portion of the graphical output of the application 119 is rendered on the screen 148 of the graphical representation of the emulated computing device.

Subsequently, other users may join the application 119 and participate like the first user. A user may start an application 119 at one client 106 and continue the application 119 at another client 106. Furthermore, multiple users at diverse locations may participate in an application 119. As a non-limiting example, an application 119 may have been developed to be executed in one device with multiple game controllers. As another non-limiting example, an application 119 may have been developed to be executed in one device, where one side of the keyboard controls the first player and the other side of the keyboard controls the second player.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106. Force feedback or other output data may be mapped to different output devices 143 of the client 106. For example, a vibration device of a virtualized smartphone may be mapped to an audio sample to be played out on another type of client 106 without a vibration device.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the server application 115 may be scaled according to the bitrate and/or other characteristics of the connection between the computing device 103 and the client 106 over the network 109.

Translation of the video and/or audio signals generated by the application 119 or video and/or audio signals generated by a media source 121 may be provided in various embodiments by the translation service 116. Users may have the opportunity to specify a preferred language for translation and to enable or disable the translation. With video, the translation service 116 is configured to translate text recognized in the video in real-time. Because the translation service 116 may be hosted in a networked plurality of computing devices 103 under a utility computing model, significant computing resources may be available to accomplish the real-time translation. The translation service 116 may be capable of translating closed captioning for a video in the same way.

The translation service 116 may maintain the visual appearance of the original text or break the visual appearance of the original text in some scenarios. In maintaining the visual appearance of the original text, the translation service 116 may remove the original text (e.g., by interpolating nearby background pixels) and then replace the original text with the translated text. The translated text may be modified to fit in the screen 148 area consumed by the original text. The translated text may be in a font, color, font weight, etc. that is similar to the original text. For example, where the original text is Korean, the translated English text may mimic the style of Korean characters.

As a non-limiting example, the original text in Mexican Spanish may include a currency value such as a number of pesos. The translation service 116 may be configured to transform the currency value into United States dollars when the original text is translated into United States English. Similar conversions may be made with other localized systems of units. The translation service 116 may be able to translate a symbol of one currency into a symbol of another currency. For example, a dollar symbol may be translated into a pound symbol, a yen symbol may be translated into a euro symbol, etc.

As another non-limiting example, the application 119 may relate to an electronic book that is in Arabic and is read from right to left. In this example, the translation service 116 may perform semantic analysis on the video and translate the text into a left to right format. The style in which the translated text is presented may be altered from the original to facilitate ease of reading in the translated format. In some cases, translation may not happen in real time due to building a buffer for semantic and contextual analysis.

In some embodiments, the application 119 may generate an audio signal with speech that may be translated. In one embodiment, text corresponding to the speech may be obtained through an application programming interface (API) of the application 119 or other metadata associated with the application 119. In another embodiment, the speech may be recognized in real-time by the translation service 116. The speech may then be translated into the preferred language of the user and rendered in a translated format. The translated format may be presented to the user as subtitles to the video and/or as translated speech in the audio signal. The translated speech may replace the original audio entirely, or the translated speech may be mixed in with the original audio.

In some embodiments, the application 119 may be configured to translate at least a portion of the input data obtained from the client 106 into the language associated with the application 119. Such data may include, for example, written or spoken communication from a user to another user of the application. Where the input data includes speech, the speech may also be translated into the language of the application 119.

Figure 2A:
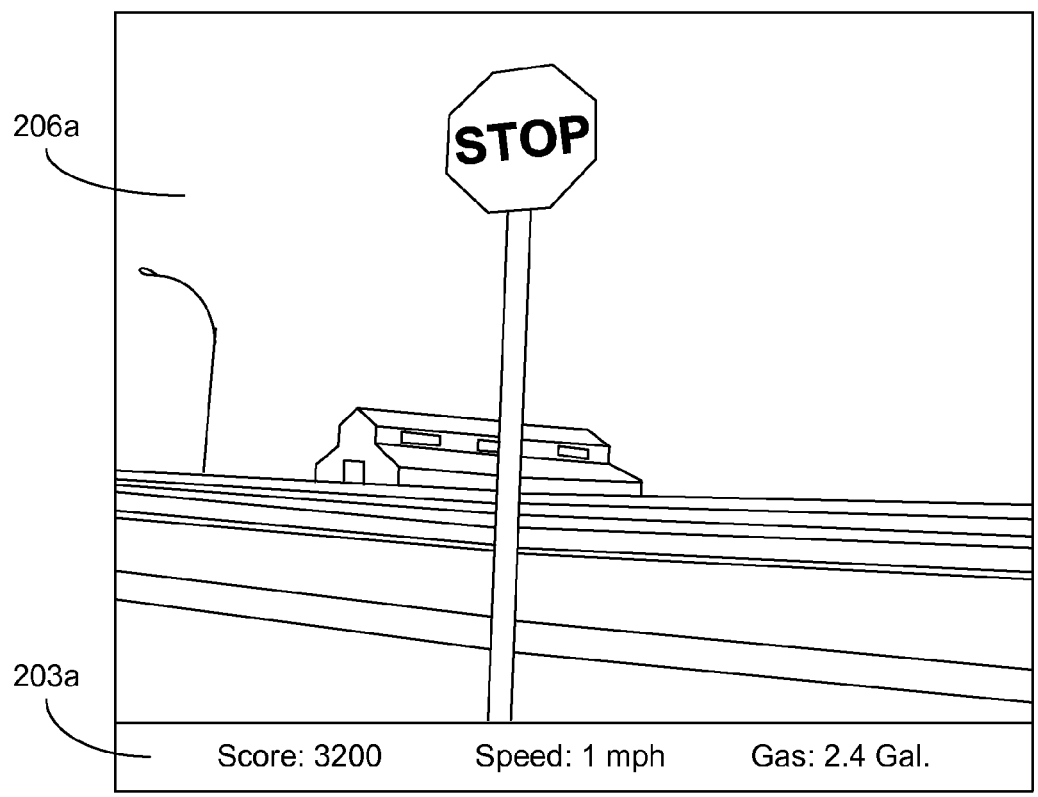
FIG. 2A is a drawing of an example of a screen rendered in a client employed in the networked environment of FIG. 1 according to various embodiments of the present disclosure.

Turning now to FIG. 2A, shown is one example of a screen 148a rendered in a client 106 (FIG. 1) in the networked environment 100 (FIG. 1). In this example, the screen 148a depicts the video output of an application 119 (FIG. 1) that corresponds to a game where one is driving a vehicle. The application 119 is configured to use United States English as the original language. A status dashboard 203a shows various statistics such as a score ("Score: 3200"), a speed ("Speed: 1 mph"), and a fuel level ("Gas: 2.4 Gal"). These statistics are presented as customized in the application 119 for the United States locale according to the system of units employed in the United States.

The game view 206a shows a visual scene in the game application 119 where the player is currently located. In this case, the player is currently approaching a stop sign. The stop sign corresponds to a stop sign customarily seen in the United States, being an octagon bearing the letters "STOP." The game view 206a may correspond, for example, to an entirely computer-generated scene, an actual video recorded at a location, a computer-generated scene incorporating samples from actual photos and/or videos, etc.

Figure 2B:
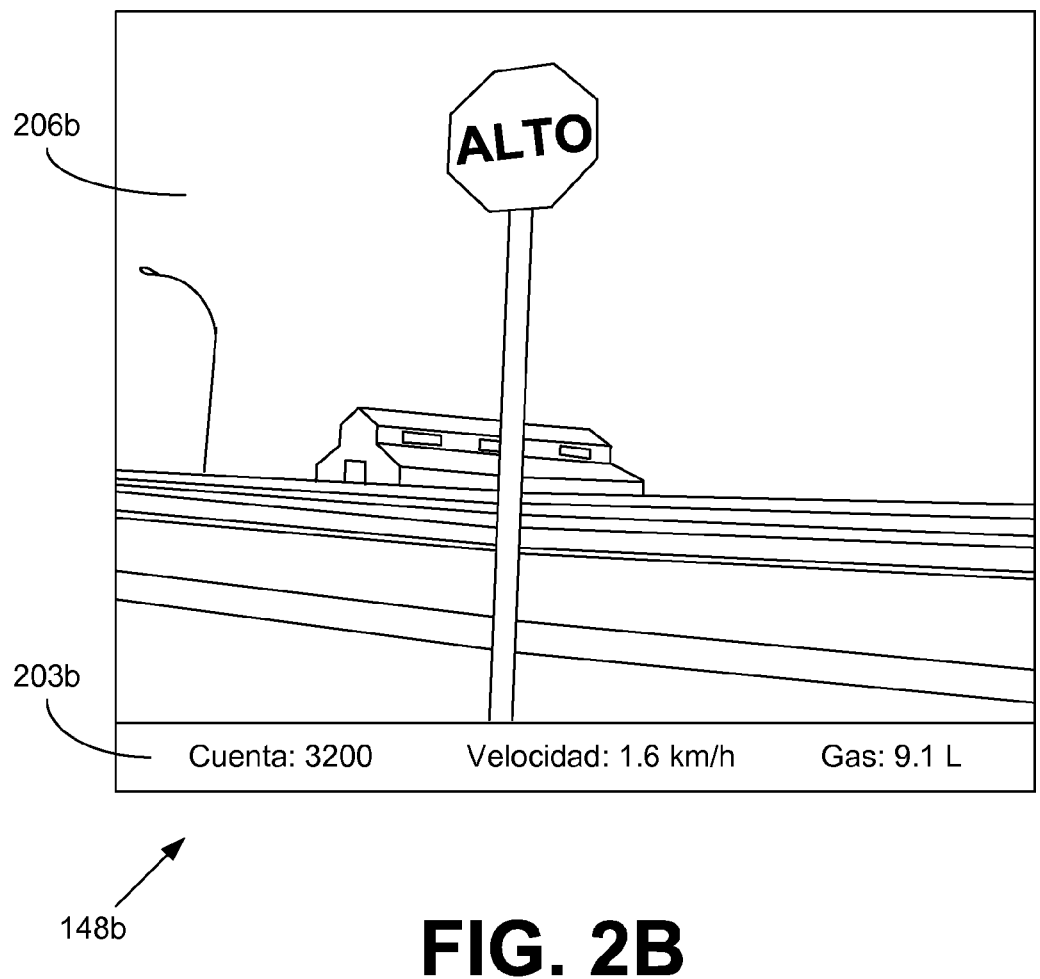
FIG. 2B is a drawing of an example of a translated version of the screen of FIG. 2A rendered in a client employed in the networked environment of FIG. 1 according to various embodiments of the present disclosure.

Moving on to FIG. 2B, shown is another example of a screen 148b rendered in a client 106 (FIG. 1) in the networked environment 100 (FIG. 1). In this example, the screen 148b corresponds to a translated version of the screen 148a (FIG. 2A) into Spanish as used in Central America. The video signal generated by the application 119 (FIG. 1) has been translated by the translation service 116 (FIG. 1). The status dashboard 203b has been translated from what was seen in the status dashboard 203a (FIG. 2A). The score has been translated to read "Cuenta: 3200." The speed has been translated to read "Velocidad: 1.6 km/h." The fuel level has been translated to read "Gas: 9.1 L." It is noted that the gas and fuel level have been translated by the translation service 116 from the United States customary system of units to the metric system as associated with the Central American Spanish localized language.

In addition, text recognized in the game view 206b has been translated. The stop sign of the game view 206a (FIG. 2A) has been translated to read "ALTO." As shown in FIG. 2B, the translated text of the game view 206b and the status dashboard 203b have been incorporated into the screen 148b so as to maintain the visual appearance of the original text. For example, similar fonts, colors, text rotations, etc. may be employed. Also, the original text is deleted, and the translated text is superimposed on top of the former location of the original text. In other embodiments, the translation service 116 may be configured to translate the symbol of the stop sign, for example, from the octagon style to a circular style employed by other countries. In this way, the translation service 116 may convert a representation common to a first language or culture to a different representation common to a second language or culture.

The translation service 116 may be further configured to alter the translated text to fit within the screen space reclaimed from the original text by abbreviating the translated text, using an alternate translation, and so on. In some cases it may not be practical to replace the original text with the translated text. In such cases, the translated text may be presented in a subtitle, dialog, audio channel, or through some other approach which may break the visual appearance of the video signal.

Figure 3:
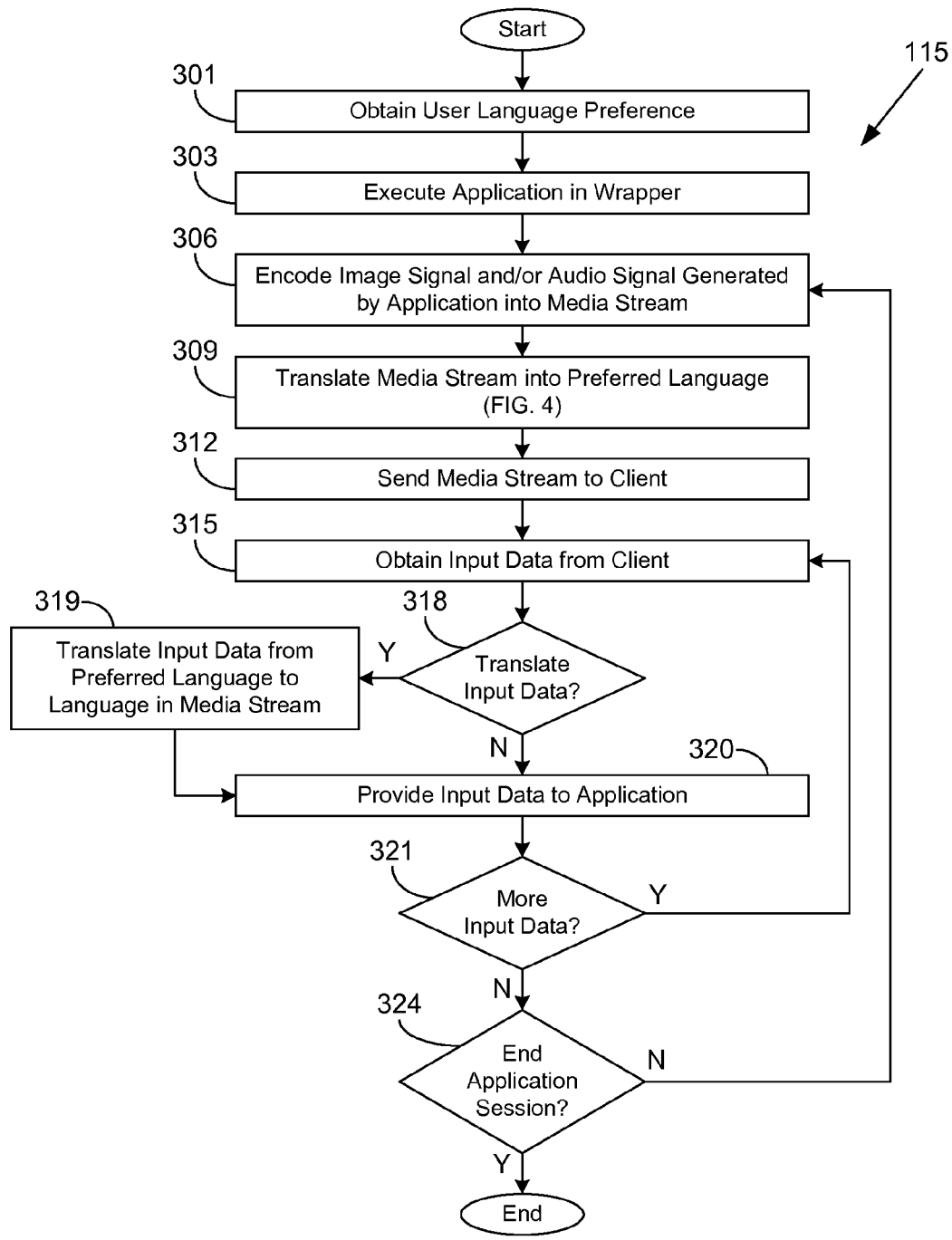
FIG. 3 is a flowchart illustrating one example of functionality implemented as portions of a server application executed in a computing device in the networked environment of FIG. 1 according to various embodiments of the present disclosure.

Referring next to FIG. 3, shown is a flowchart that provides one example of the operation of a portion of the server application 115 according to various embodiments. It is understood that the flowchart of FIG. 3 provides merely an example of the many different types of functional arrangements that may be employed to implement the operation of the portion of the server application 115 as described herein. As an alternative, the flowchart of FIG. 3 may be viewed as depicting an example of steps of a method implemented in the computing device 103 (FIG. 1) according to one or more embodiments.

Beginning with box 301, the server application 115 obtains a user language preference from the client 106 (FIG. 1). Such a language preference may be stored in the user data 135 (FIG. 1) or obtained in each session. In some cases, the user language preference may be determined automatically based on geolocation using a network 109 (FIG. 1) address, a global positioning system (GPS) location of the client 106, stored address information, and/or other data. The language preference may refer to a generic language or a localized version of a language.

In box 303, the server application 115 executes a selected application 119 (FIG. 1) from the applications 127 (FIG. 1) within the appropriate wrapper 118 (FIG. 1). In box 306, the server application 115 encodes the image signal and/or audio signal generated by and captured from the application 119 into a media stream using one or more media encoders 120 (FIG. 1). The image signal may correspond to a video signal or a stream of images. In box 309, the server application 115 translates the media stream from an original language into the preferred language using the translation service 116 (FIG. 1). One example of such a media stream translation by the translation service 116 is given in the flowchart of FIG. 4. In some embodiments, the translation may be enabled or disabled in response to a user command sent from the client 106. Further, the preferred language may be modified by the user, and the original language in the source signals may be dynamically determined. In box 312, the server application 115 sends the media stream to the client 106 over the network 109 as application output data 123 (FIG. 1).

In box 315, the server application 115 obtains input data from the client 106 in the application input data 122 (FIG. 1). Such input data may, for example, correspond to input commands, text communications, audio communications, and/or other forms of input data for the application 119. In box 318, the server application 115 determines whether at least a portion of the input data is to be translated. If at least a portion of the input data is to be translated, the server application 115 proceeds to box 319 and translates the input data from the preferred language into the original language of the media stream. The server application 115 then continues to box 320. If the input data is not to be translated, the server application 115 instead proceeds from box 318 to box 320.

In box 320, the server application 115 provides the input data to the application 119 via the wrapper 118. In various embodiments, the input data may be provided to the application 119 through one or more virtualized input devices of the wrapper 118. In box 321, the server application 115 determines whether more input data is to be obtained. If more input data is to be obtained, the server application 115 returns to box 315 and obtains the input data from the client 106. If no more input data is to be obtained, the server application 115 continues to box 324 and determines whether the session of the application 119 is to be ended. If the session of the application 119 is not to be ended, the server application 115 returns to box 306 and continues encoding the video signal and/or audio signal generated by the application 119 into the media stream. Otherwise, the portion of the server application 115 ends.

Figure 4:
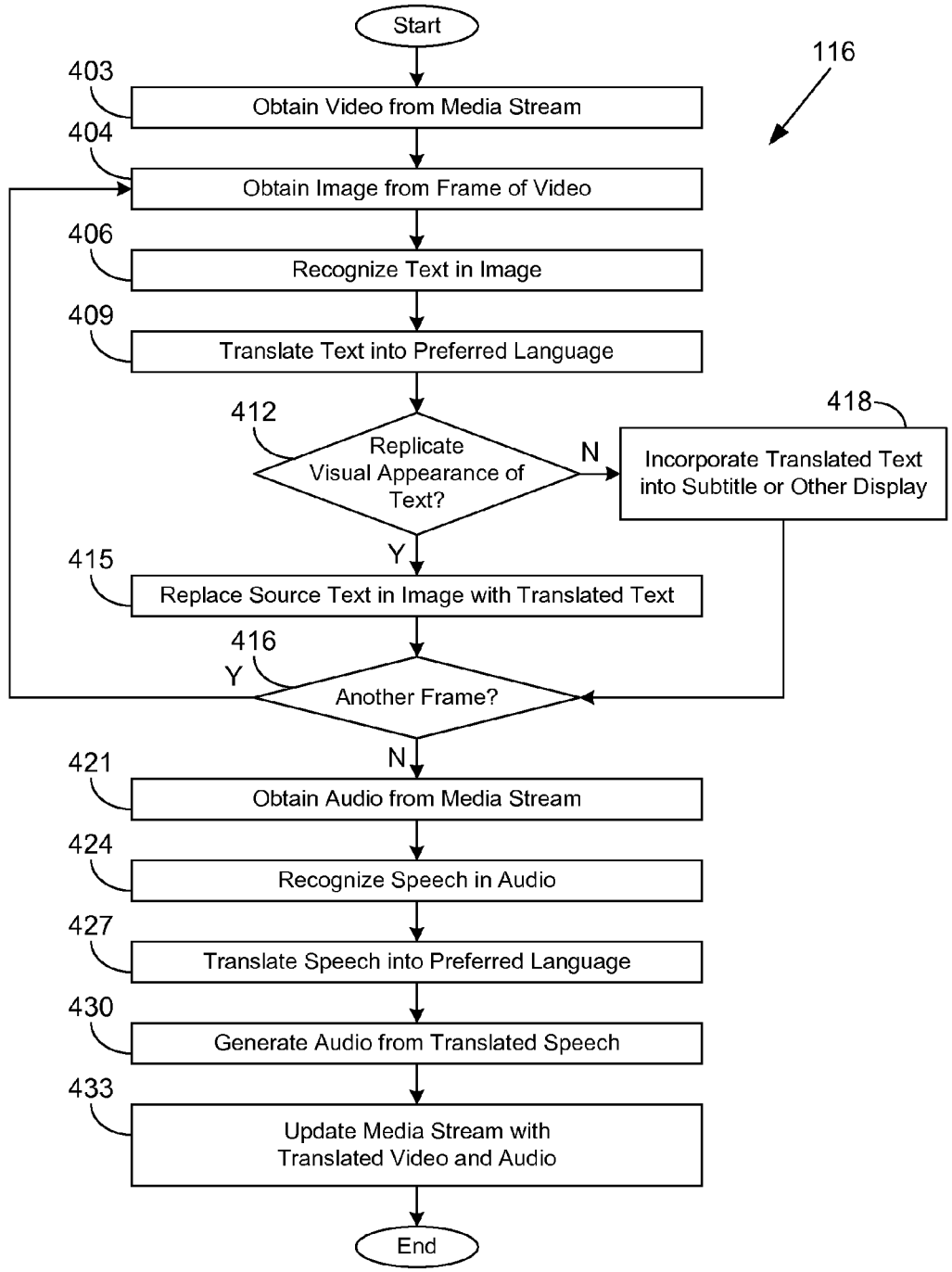
FIG. 4 is a flowchart illustrating one example of functionality implemented as portions of a translation service executed in a computing device in the networked environment of FIG. 1 according to various embodiments of the present disclosure.

Turning now to FIG. 4, shown is a flowchart that provides one example of the operation of a portion of the translation service 116 according to various embodiments. It is understood that the flowchart of FIG. 4 provides merely an example of the many different types of functional arrangements that may be employed to implement the operation of the portion of the translation service 116 as described herein. As an alternative, the flowchart of FIG. 4 may be viewed as depicting an example of steps of a method implemented in the computing device 103 (FIG. 1) according to one or more embodiments. Although the translation service 116 is described as performing both video and audio translation, either video or audio translation may be exclusively performed in some embodiments.

Beginning with box 403, the translation service 116 obtains the video from a media stream. In box 404, the translation service 116 obtains an image from a frame of the video. In box 406, the translation service 116 recognizes text contained in the image. To this end, the translation service 116 may detect the language of the text and/or the format of the text. For example, the text may be formatted left-to-right, right-to-left, vertically, horizontally, etc. Instead of automatic detection, the translation service 116 may refer to metadata associated with the application 119 (FIG. 1) in some circumstances. In box 409, the translation service 116 translates the source text into the preferred language of the user.

In box 412, the translation service 116 determines whether the visual appearance of the text is to be replicated in the image. If so, the translation service 116 moves to box 415 and replaces the source text in the image with translated text in a preferred language. To this end, the translation service 116 may remove the source text from the image by replicating or interpolating background areas into the screen area of the source text. The translated text may then be superimposed onto the area vacated by the source text. The translated text may be altered, e.g., with an abbreviation, alternate translation, etc., to fit into the space vacated by the source text.

The translated text may be rendered in a color, font, or other text style that is similar to the source text. Currencies, systems of units, symbols, and/or other representations may be converted as appropriate given representations common to the localized languages. For example, colloquialisms in one dialect of a language may be translated into other words or phrases within a different dialect of the language. The reading style of the text may also be altered, e.g., right-to-left may be converted to left-to-right, etc. In some cases, the original reading style may be mimicked due to space constraints, e.g., a word written vertically in Japanese may be also written vertically in English, etc. The translation service 116 then proceeds to box 416.

If the translation service 116 instead determines in box 412 that the visual appearance of the text is not to be replicated, the translation service 116 instead moves from box 412 to box 418 and incorporates the translated text into a subtitle or other auxiliary display. As a non-limiting example, a dialog box may be provided at the bottom with the translated text. As another non-limiting example, subtitles may be superimposed in a bottom portion of the image or near or on the location of the source text in the image. In one embodiment, the translated text may be rendered as speech in an audio signal. The translation service 116 then proceeds to box 416.

In box 416, the translation service 116 determines whether there is another frame of the video to be processed. If there is another frame to be processed, the translation service 116 returns to box 404 and obtains an image from the other frame of the video. If there is not another frame to be processed, the translation service 116 proceeds from box 416 to box 421.

In box 421, the translation service 116 obtains audio from the media stream. In box 424, the translation service 116 recognizes speech in the audio. A language associated with the speech may be dynamically determined or determined through metadata associated with the application 119. In box 427, the translation service 116 translates the speech into the preferred language or another language. In one embodiment, the translation service 116 may convert the speech to text and then generate translated text from the text. In box 430, the translation service 116 generates audio from the translated speech using, e.g., a text-to-speech converter or other software. In box 433, the translation service 116 updates the media stream with the translated video and/or audio. In one embodiment, the translated text and/or audio is sent separately to the client 106 to be rendered separately by the client application 145 (FIG. 1). Thereafter, the portion of the translation service 116 ends.

Figure 5:
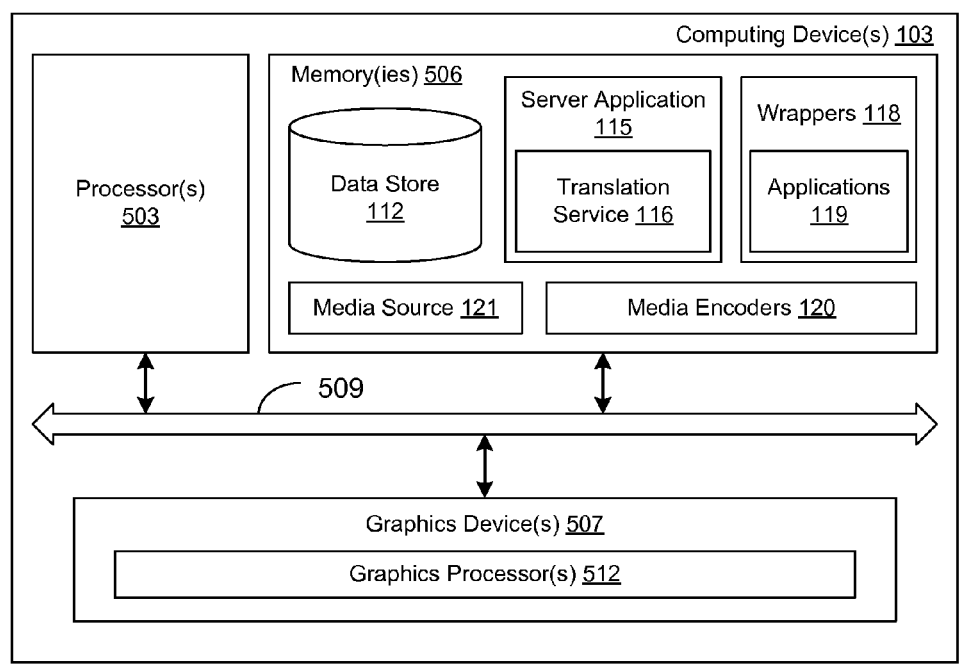
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503, a memory 506, and one or more graphics devices 507, all of which are coupled to a local interface 509. To this end, the computing device 103 may comprise, for example, at least one server computer or like device. The local interface 509 may comprise, for example, a data bus with an accompanying address/control bus or other bus structure as can be appreciated. The graphics devices 507 may correspond to high-performance graphics hardware, including one or more graphics processors 512. The graphics devices 507 are configured to render graphics corresponding to the applications 119 executed in the computing device 103.

Stored in the memory 506 are both data and several components that are executable by the processor 503. In particular, stored in the memory 506 and executable by the processor 503 are the server application 115, the translation service 116, the wrappers 118, the applications 119, the media encoders 120, the media source 121, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the server application 115, the translation service 116, the wrappers 118, the applications 119, the media encoders 120, the media source 121, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the translation service 116 and the server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the translation service 116, the wrappers 118, the applications 119, the media encoders 120, the media source 121, and the client application 145, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that obtains an identification of a preferred language from a client;
   code that executes an application in a hosted environment, wherein the application is separate from the program and wherein the application generates a media stream comprising a video signal and an audio signal;
   code that captures the media stream generated by the application;
   code that recognizes untranslated text shown within the video signal;
   code that generates translated text by translating the untranslated text from an original language into the preferred language;
   code that determines whether to replicate a visual appearance of the untranslated text in the video signal;
   code that formats the translated text to replicate the visual appearance of the untranslated text in the video signal in response to a determination to replicate the visual appearance of the untranslated text;
   code that adds a subtitle corresponding to the translated text to the video signal when the visual appearance of the untranslated text is not to be replicated;
   code that inserts the translated text into the video signal of the media stream to replace the untranslated text in the video signal of the media stream;
   code that recognizes untranslated speech in the audio signal;
   code that generates translated speech by translating the untranslated speech from the original language into the preferred language;
   code that inserts the translated speech into the audio signal of the media stream to replace the untranslated speech in the audio signal of the media stream;
   code that sends the media stream to the client in response to replacing the untranslated text in the video signal of the media stream with the translated text and the untranslated speech in the audio signal of the media stream with the translated speech;
   code that obtains input data from the client; and
   code that provides the input data to the application through at least one virtualized input device, at least a portion of the input data being translated from the preferred language into the original language.

2. The non-transitory computer-readable medium of claim 1, wherein the hosted environment virtualizes an emulated computing device, and the application is executable in the emulated computing device.

3. The non-transitory computer-readable medium of claim 1, wherein the computing device is a first computing device and the program further comprises code that encodes a user interface for rendering in the client, the user interface including a graphical representation of a model of a second computing device, wherein a screen of the graphical representation of the model of the second computing device is configured to render at least a portion of the video signal from the media stream.

4. The non-transitory computer-readable medium of claim 1, wherein the application comprises a video game application.

5. A system, comprising:
   a first computing device; and
   a first application executable in the first computing device, the first application comprising:
      logic that executes a second application in a hosted environment;
      logic that captures a media stream outputted by the second application, the media stream comprising a video stream;
      logic that recognizes untranslated text shown within the video stream;
      logic that generates translated text by translating the untranslated text from a first language into a second language;
      logic that determines whether to replicate a visual appearance of the untranslated text in the video stream;
      logic that formats the translated text to replicate the visual appearance of the untranslated text in the video stream in response to a determination to replicate the visual appearance of the untranslated text;
      logic that adds a subtitle corresponding to the translated text to the video stream when the visual appearance of the untranslated text is not to be replicated;
      logic that inserts the translated text into the video stream of the media stream to replace the untranslated text shown within the video stream of the media stream; and
      logic that forwards the media stream to a second computing device in response to inserting the untranslated text with the translated text.

6. The system of claim 5, where the first language and the second language are different localized versions of a third language.

7. The system of claim 5, wherein the first application further comprises logic that obtains an identification of the second language from the second computing device.

8. The system of claim 5, wherein the logic that generates the translated text is configured to convert a first representation common to the first language into a second representation common to the second language.

9. The system of claim 8, wherein the first representation corresponds to a first system of units associated with the first language, and the second representation corresponds to a second system of units associated with the second language.

10. The system of claim 8, wherein the first representation corresponds to a first symbol comprising at least a first shape of a first sign associated with the first language, and the second representation corresponds to a second symbol comprising at least a second shape of a second sign associated with the second language.

11. The system of claim 8, wherein the first application further comprises logic that obtains data from the second computing device to facilitate a conversion from the first representation to the second representation.

12. The system of claim 5, wherein the logic that inserts the translated text into the video stream further comprises:
    logic that removes the untranslated text from the video stream by replicating a surrounding background of the untranslated text within a screen area occupied by the untranslated text; and
    logic that superimposes the translated text in a text style that corresponds to the untranslated text, the translated text being superimposed relative to the screen area occupied by the untranslated text.

13. The system of claim 12, wherein the logic that inserts the translated text into the video stream of the media stream further comprises logic that alters the translated text based at least in part on the screen area occupied by the untranslated text.

14. The system of claim 5, wherein the media stream further comprises an audio stream and the first application further comprises:
    logic that recognizes untranslated speech contained in the audio stream;
    logic that generates translated speech by translating the untranslated speech from the first language into the second language; and
    logic that inserts the translated speech into the audio stream of the media stream to replace the untranslated speech within the audio stream of the media stream.

15. The system of claim 14, wherein the logic that recognizes the untranslated speech is configured to generate recognized text corresponding to the untranslated speech, and the logic that generates the translated speech is configured to generate the translated speech from a translated version of the recognized text corresponding to the untranslated speech.

16. The system of claim 5, wherein the first application further comprises:
    logic that obtains input data from the second computing device; and
    logic that provides the input data to the second application.

17. The system of claim 16, wherein the hosted environment corresponds to a virtualized environment, and the logic that provides the input data to the second application is configured to provide the input data to the second application through at least one virtualized input device.

18. The system of claim 16, wherein the first application further comprises:
    logic that generates translated input data by translating at least a portion of the input data from the second language into the first language; and
    wherein the logic that provides the input data to the second application is configured to provide the translated input data in place of the at least a portion of the input data.

19. The system of claim 5, wherein the second application comprises a video game application.

20. A method, comprising:
    executing, in at least one computing device, a first application in a hosted environment;
    obtaining, via a second application in the at least one computing device, a media stream generated by the first application, the media stream comprising an audio signal and a video signal;
    recognizing, via the second application in the at least one computing device, untranslated speech in the audio signal;
    generating, via the second application in the at least one computing device, translated speech by translating the untranslated speech from a first language into a second language;
    inserting, via the second application in the at least one computing device, the translated speech into the audio signal to replace the untranslated speech in the audio signal;
    recognizing, via the second application in the at least one computing device, untranslated text shown within the video signal;
    generating, via the second application in the at least one computing device, translated text by translating the untranslated text from the first language into the second language;
    determining, via the second application, whether to replicate a visual appearance of the untranslated text in the video signal;
    formatting, via the second application, the translated text to replicate the visual appearance of the untranslated text in the video signal in response to a determination to replicate the visual appearance of the untranslated text;
    adding, via the second application, a subtitle corresponding to the translated text to the video signal when the visual appearance of the untranslated text is not to be replicated;
    inserting, via the second application in the at least one computing device, the translated text into the video signal to replace the untranslated text in the video signal; and
    sending, via the second application in the at least one computing device, the media stream to another computing device.

21. The method of claim 20, further comprising:
    obtaining, via the second application in the at least one computing device, input data from the another computing device; and
    providing, via the second application in the at least one computing device, the input data to the first application through at least one virtualized input device.

22. The method of claim 20, wherein:
    recognizing further comprises generating, via the second application in the at least one computing device, text corresponding to the untranslated speech; and
    generating further comprises generating, via the second application in the at least one computing device, the translated speech from a translated version of the text corresponding to the speech.

23. The method of claim 20, further comprising obtaining, via the second application in the at least one computing device, an identification of the second language from the another computing device.

24. The method of claim 20, further comprising converting, via the second application in the at least one computing device, a first symbol comprising at least a first shape of a first sign associated with the first language to a second symbol comprising at least a second shape of a second sign associated with the second language.

25. The method of claim 20, wherein the first application comprises a video game application.

* * * * *